| United States Patent [19] | [11] | 4,195,007 |
|---|---|---|
| Kobayashi et al. | [45] | Mar. 25, 1980 |

[54] PROCESS FOR STABILIZING AQUEOUS SOLUTION OF ACRYLIC OR METHACRYLIC HYDRAZIDE POLYMERS

[75] Inventors: Masahiro Kobayashi; Tadao Yabuhara, both of Tokushima, Japan

[73] Assignee: Otsuka Chemical Co., Ltd., Osaka, Japan

[21] Appl. No.: 940,739

[22] Filed: Sep. 8, 1978

[30] Foreign Application Priority Data

Sep. 9, 1977 [JP] Japan .............................. 52-109199

[51] Int. Cl.² .............................................. C08K 3/16
[52] U.S. Cl. ..................... 260/29.6 HN; 260/29.6 TA
[58] Field of Search ................. 260/29.6 HN, 29.6 M, 260/29.6 TA; 526/51, 307

[56] References Cited

U.S. PATENT DOCUMENTS 3,679,640  7/1972  Moore .................................. 526/51

OTHER PUBLICATIONS

W. Kern et al., Makromol. Chem., 22, 1957, pp. 31–38.

Primary Examiner—Paul R. Michl
Attorney, Agent, or Firm—Armstrong, Nikaido, Marmelstein & Kubovcik

[57] ABSTRACT

A process for stabilizing an aqueous solution of an acrylic or methacrylic hydrazide polymer by adding to the aqueous solution, at least an equal amount of hydrazine hydrate and/or a water-soluble alkaline earth metal salt of an inorganic acid based on the weight of the acrylic or methacrylic hydrazide polymer.

6 Claims, No Drawings

PROCESS FOR STABILIZING AQUEOUS SOLUTION OF ACRYLIC OR METHACRYLIC HYDRAZIDE POLYMERS

BACKGROUND OF THE INVENTION

The present invention relates to a process for stabilizing an aqueous solution of an acrylic or methacrylic hydrazide polymer.

It is known that a water-soluble polymer containing acrylic or methacrylic hydrazide units in its polymer chain is available as a polymeric cross-linking agent because of the high activity caused by hydrazide group, also as a sizing agent, a strengthening agent and a fire retardant for paper because of showing behavior as a cationic polymer in an acidic aqueous solution, and as a sequestering agent because of forming chelate compounds with various heavy metal ions.

However, an aqueous solution of such an acrylic or methacrylic hydrazide polymer is very unstable, and the gelation of the aqueous solution takes place in a short period of time and the polymer becomes insoluble in water. Therefore, since the storage of the aqueous solution is difficult, the aqueous solution must be used immediately after the preparation. For such a reason, the acrylic or methacrylic hydrazide polymers have not been effectively employed, despite that the useful properties as mentioned above are known.

OBJECTS OF THE INVENTION

It is an object of the present invention to provide a process for stabilizing an aqueous solution of acrylic or methacrylic hydrazide polymers.

Another object of the invention is to provide a process for stabilizing the aqueous solution by which the aqueous solution can be kept for a long term without causing gelation.

These and other objects of the invention will become apparent from the description hereinafter.

DETAILED DESCRIPTION

It has now been found that the above-mentioned objects can be accomplished by making coexist in an aqueous solution of an acrylic or methacrylic hydrazide polymer, at least an equal amount of hydrazine hydrate and/or a water-soluble alkailine earth metal salt of an inorganic acid based on the weight of the polymer.

The process of the present invention is applicable to acrylic or methacrylic hydrazide polymers (hereinafter referred to as "(meth)acrylic hydraside polymers") having the following general formula:

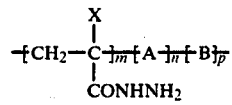

wherein X is hydrogen atom or methyl group, A is acrylamide unit, an acrylate unit or a methacrylate unit, B is a monomer unit copolymerizable with acrylamide, acrylate or methacrylate, and there is the following relationship among m, n and p:

$m+n+p=100\%$ by mole $30\%$ by mole $\leq m \leq 100\%$ by mole $0\%$ by mole $\leq n+p \leq 70\%$ by mole In the present invention, the (meth)acrylic hydrazide polymers may be any of those shown in the above general formula where each unit is linked alternately or in block or in random. In general, the (meth)acrylic hydrazide polymers are prepared by thermally reacting homo- or co-polymers of acrylamide, acrylate or methacrylate, or copolymers of these monomers with monomers copolymerizable therewith, with 10 to 30 moles of hydrazine hydrate per mole of the acrylamide, acrylate or methacrylate unit in the polymer chain. In some cases, the copolymerizable monomer units may react with hydrazine hydrate. For instance, in case that vinyl acetate is copolymerized as a monomer copolymerizable with acrylamide, acrylate or methacrylate, acetoxyl group of the vinyl acetate units is hydrolyzed by hydrazine hydrate to hydroxyl group. Such polymers are also included in the (meth)acrylic hydrazide polymers as defined above. Also, hydrazide group may intramolecularly or intermolecularly react with other hydrazide group, an ester group or amide group and cross-linking partially takes place. The process of the invention is also applicable to such polymers unless they are insoluble in water.

Examples of the acrylate employed to prepare the (meth)acrylic hydrazide polymers are acrylic acid alkyl esters such as methyl, ethyl, butyl and 2-ethylhexyl acrylates. Examples of the methacrylate are methacrylic acid alkyl esters such as methyl, ethyl and butyl methacrylates. Examples of the monomer copolymerizable with acrylamide, acrylate or methacrylate are vinyl chloride, vinylidene chloride, vinyl acetate, butadiene, styrene, maleic anhydride and acrylonitrile.

It is necessary that the (meth)acrylic hydrazide polymers as defined above contain at least 30% by mole of the (meth)acrylic hydrazide units. When the content of the (meth)acrylic hydrazide units is less than 30% by mole, the polymers are poor in useful properties caused by hydrazide group.

In the present invention, the intrinsic viscosity $[\eta]$ of the (meth)acrylic hydrazide polymers falls within the range of 0.4 to 28 (in water at 25° C.), and the polymers are usually employed in the form of an aqueous solution in concentration from 1 to 10% by weight for convenience in handling.

The aqueous solution of the (meth)acrylic hydrazide polymers can be stabilized by the addition of hydrazine hydrate and/or a water-soluble alkaline earth metal salt of an inorganic acid.

Although it is not necessarily definite how the (meth)acrylic hydrazide polymers react in their aqueous solution to set to gel, and also although it is not necessarily definite how hydrazine hydrate or the water-soluble alkaline earth metal prevents the gelation of the polymers, it may be considered that the stabilization of an aqueous solution of the polymers is brought about by the peculiarity of hydrazine hydrate or the water-soluble alkaline earth metal salt as mentioned below. In case of hydrazine hydrate, the basic property is mentioned as its typical property. However, even if basic compounds such as ammonia, calcium hydroxide, magnesium hydroxide and sodium carbonate are added in varied amounts to an aqueous solution of the polymers, they cannot prevent the gelation of the solution. Therefore, the peculiar phenomenon that only hydrazine hydrate among basic compounds can prevent the gelation may be considered to be brought about on the basis of the fact that hydrazine hydrate has a similar structure to hydrazide group of the (meth)acrylic hydrazide polymers and has a higher activity than hydrazide group. With respect to the water-soluble alkailine earth metal salt of an inorganic acid, whereas the (meth)acrylic hydrazide polymers form chelates with transition metal ions and are stabilized but insolubilized in water, and also scarcely form complex salts with alkali metal ions and, therefore, these transition and alkali metal ions do not contribute to the stabilization of the aqueous solution, the aqueous solution of the polymers can be stabilized by the addition of the water-soluble alkaline earth metal salt. It may be considered that this fact is based on the formation of a water-soluble complex or double salt between the (meth)acrylic hydrazide polymer and the water-soluble alkaline earth metal salt.

In the present invention, it is necessary to employ an equal amount or more of hydrazine hydrate and/or a water-soluble alkaline earth metal salt of an inorganic salt based on the weight of the (meth)acrylic hydrazide polymers dissolved in water. Hydrazine hydrate is employed preferably in an amount satisfying the following equation.

$$\frac{\text{Weight of hydrazine hydrate} \times 100}{\text{Weight of water} + \text{Weight of hydrazine hydrate}} < 85$$

When the water-soluble alkaline earth metal salt is employed for the stabilization, it is preferably added to an aqueous solution of the (meth)acrylic hydrazide polymers so as to be present in the solution in concentration below a saturation concentration of the employed water-soluble alkaline earth metal salt, since the viscosity of the aqueous solution remarkably increases, when employed in excess.

Examples of the water-soluble alkaline earth metal salt of an inorganic acid employed in the present invention are alkaline earth metal halides such as calcium halides, magnesium halides, barium halides, strontium halides and beryllium halides. Calcium chloride is preferably employed in the present invention. These water-soluble alkaline earth metal salts may be employed singly or in admixture thereof.

The addition of hydrazine hydrate or the water-soluble alkaline earth metal salt may be conducted in a suitable manner in which hydrazine hydrate or the water-soluble alkaline earth metal salt is added to an aqueous solution of the (meth)acrylic hydrazide polymer; or the polymer is added to water together with hydrazine hydrate or the water-soluble alkaline earth metal salt and is dissolved; or the polymer is added to an aqueous solution of hydrazine hydrate or the water-soluble alkaline earth metal salt and is dissolved.

The stabilized aqueous solution of the (meth)acrylic hydrazide polymers can be kept for a long term without causing gelation and, therefore, it has become possible to practically and industrially utilize the (meth)acrylic hydrazide polymers as paper sizing agents, paper strengthening agents, antistatic agents, binders for rock wool board, binders for gypsum board, flocculants, dispersing agents, sequestering agents and polymerization catalysts.

The present invention is more particularly described and explained by means of the following Examples, in which all % and parts are by weight unless otherwise noted. In order to illustrate the preparation of the (meth)acrylic hydrazide polymers, the following Reference Examples are also presented.

REFERENCE EXAMPLE 1

A three liter four neck flask was charged with 1 kg. of a 10% aqueous solution of polyacrylamide having an average degree of polymerization of about 10,000 to about 13,000 and 1 kg. of a 80% aqueous solution of hydrazine hydrate, and the reaction was then carried out at 80° C. for 5 hours with agitation.

The obtained viscous reaction mixture was poured into methanol in an amount of about 15 times the volume of the reaction mixture to give a white precipitate. After conducting the reprecipitation for purification, the precipitate was dried at 60° C. under vacuum.

The thus obtained polymer contained 84% by mole of the acrylic hydrazide units which was measured by the iodometric titration method.

REFERENCE EXAMPLE 2

A three liter four neck flask was charged with 200 g. of polymethyl acrylate having an average degree of polymerization of about 15,000 and 2 kg. of a 80% aqueous solution of hydrazine hydrate, and the reaction was then carried out at 80° C. for 3 hours with agitation.

The obtained viscous reaction mixture was poured into about 20 liters of methanol to give a white precipitate. After conducting the reprecipitation for purification, the precipitate was dried at 60° C. under vacuum.

The thus obtained polymer contained 88% by mole of the acrylic hydrazide units.

REFERENCE EXAMPLE 3

A three liter four neck flask was charged with 1 kg. of a 10% aqueous solution of polyacrylamide having an average degree of polymerization of about 10,000 to about 13,000 and 1 kg. of a 80% aqueous solution of hydrazine hydrate, and the reaction was then carried out at a temperature of 50° to 55° C. for 6 hours with agitation.

The obtained viscous reaction mixture was poured into methanol in an amount of about 20 times the volume of the reaction mixture to give a white precipitate. After conducting the reprecipitation for purification, the precipitate was dried at 60° C. under vacuum. The thus obtained polymer contained 42% by mole of the acrylic hydrazide units.

REFERENCE EXAMPLE 4

A three liter four neck flask was charged with 100 g. of acrylamide-styrene copolymer powder containing 10% by mole of the styrene units and 1.5 kg. of a 80% aqueous solution of hydrazine hydrate. The reaction was carried out at 80° C. for 10 hours in a nitrogen stream with agitation, and the resulting reaction mixture was then treated in the same manner as in Reference Example 1.

The thus obtained water-soluble polymer contained 82% by mole of the acrylic hydrazide units.

EXAMPLES 1 to 3

Six parts of the white powder of acrylic hydrazide polymer obtained in Reference Example 1 and 8 parts of hydrazine hydrate were dissolved in 95 parts of water. The thus prepared aqueous solution was placed in a thermostat and the stability was observed at 50° C.

The above procedures were repeated except that the amount of hydrazine hydrate was varied (20 parts and 30 parts).

The results of the stability test are shown in Table.

EXAMPLE 4

Four parts of the white powder of acrylic hydrazide polymer obtained in Reference Example 2 and 10 parts of hydrazine hydrate were dissolved in 96 parts of water. The stability test of the prepared aqueous solution was conducted in a thermostat at 50° C.

The result is shown in Table.

EXAMPLE 5

Eight parts of the white powder of acrylic hydrazide polymer obtained in Reference Example 3 and 20 parts of hydrazine hydrate were dissolved in 92 parts of water. The stability test of the prepared aqueous solution was conducted in a thermostat at 50° C.

The result is shown in Table.

EXAMPLES 6 to 9

Five parts of the white powder of acrylic hydrazide polymer obtained in Reference Example 1 and 5 parts of calcium chloride were dissolved in 95 parts of water.

Aqueous solutions were further prepared in the same manner as the above except that calcium chloride was employed in amounts of 10 parts, 20 parts and 30 parts respectively.

The stability test of the thus prepared aqueous solutions was conducted in a thermostat at 50° C. The results are shown in Table.

EXAMPLES 10 to 13

The procedures of Examples 6 to 9 were repeated except that the white powder of acrylic hydrazide polymer obtained in Reference Example 4 was employed instead of that obtained in Reference Example 1.

The results of the stability test are shown in Table.

COMPARATIVE EXAMPLE 1

Six parts of the white powder of acrylic hydrazide polymer obtained in Reference Example 1 was dissolved in 95 parts of water. The stability test of the prepared aqueous solution was conducted in a termostat at 50° C.

The result is shown in Table.

COMPARATIVE EXAMPLE 2

Four parts of the white powder of acrylic hydrazide polymer obtained in Reference Example 2 and 3 parts of hydrazine hydrate were dissolved in 96 parts of water. The stability test of the prepared aqueous solution was conducted in a thermostat at 50° C.

The result is shown in Table.

COMPARATIVE EXAMPLE 3

Eight parts of the white powder of acrylic hydrazide polymer obtained in Reference Example 3 was dissolved in 92 parts of water. The stability test of the prepared aqueous solution was conducted in a thermostat at 50° C.

The result is shown in Table.

COMPARATIVE EXAMPLE 4

Five parts of the white powder of acrylic hydrazide polymer obtained in Reference Example 1 and 4 parts of calcium chloride were dissolved in 95 parts of water. The stability test of the prepared aqueous solution was conducted in a thermostat at 50° C.

The result is shown in Table.

COMPARATIVE EXAMPLE 5

Five parts of the white powder of acrylic hydrazide polymer obtained in Reference Example 4 and 3 parts of calcium chloride were dissolved in 95 parts of water. The stability test of the prepared aqueous solution was conducted in a thermostat at 50° C.

The result is shown in Table.

| | Polymer | | Additive | | Water | |
|---|---|---|---|---|---|---|
| Ex. No. | Kind | Amount part | Kind | Amount part | Amount part | Stability |
| Ex. 1 | Ref. Ex. 1 | 6 | hydrazine hydrate | 8 | 95 | flowable even after 3 months |
| Ex. 2 | " | 6 | " | 20 | 95 | flowable even after 3 months |
| Ex. 3 | " | 6 | " | 30 | 95 | flowable even after 3 months |
| Com. Ex. 1 | " | 6 | — | — | 95 | gels in 2 days |
| Ex. 4 | Ref. Ex. 2 | 4 | hydrazine hydrate | 10 | 96 | flowable even after 5 months |
| Com. Ex. 2 | " | 4 | " | 3 | 96 | gels in 20 days |
| Ex. 5 | Ref. Ex. 3 | 8 | hydrazine hydrate | 20 | 92 | flowable even after 3 months |
| Com. Ex. 3 | " | 8 | — | — | 92 | gels in 2 days |
| Ex. 6 | Ref. Ex. 1 | 5 | calcium chloride | 5 | 95 | flowable for 2 months but gels after 3 months |
| Ex. 7 | " | 5 | " | 10 | 95 | flowable even after 3 months |
| Ex. 8 | " | 5 | " | 20 | 95 | flowable even after 3 months |
| Ex. 9 | " | 5 | " | 30 | 95 | flowable even after 3 months |
| Com. Ex. 4 | " | 5 | " | 4 | 95 | gels in 20 days |
| Ex. 10 | Ref. Ex. 4 | 5 | calcium chloride | 5 | 95 | flowable for 2 months but gels after 3 months |
| Ex. 11 | " | 5 | " | 10 | 95 | flowable even after 3 months |
| Ex. 12 | " | 5 | " | 20 | 95 | flowable even after 3 months |
| Ex. 13 | " | 5 | " | 30 | 95 | flowable even after 3 mohths |
| Com. Ex. 5 | " | 5 | " | 3 | 95 | gels in 20 days |

[Using Test]

The aqueous solution of acrylic hydrazide polymer prepared in Example 8 was kept for 3 months at 50° C., and the polymer concentration of the aqueous solution was then adjusted to 0.02% by diluting with water.

A one liter ground stopper messcylinder having a height of 40 cm. was charged with one liter of a 2.5% aqueous suspension of kaolin (first class grade chemical), and 5 ml. of the diluted aqueous solution of acrylic hydrazide polymer was added to the messcylinder. The mixture was then admixed by reversing the messcylinder 10 times, and immediately the sedimentation speed of the suspended material was measured. The interface fell by 25 cm. in 45 seconds. From this result, it was confirmed that the polymer had an excellent coagulating property.

What we claim is:

1. A process for stabilizing an aqueous solution of an acrylic or methacrylic hydrazide polymer which comprises adding hydrazine hydrate and/or a water-soluble alkaline earth metal salt of an inorganic acid to an aqueous solution of an acrylic or methacrylic hydrazide polymer having the following general formula:

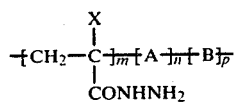

wherein X is hydrogen atom or methyl group, A is acrylamide unit, an acrylate unit or a methacrylate unit, B is a monomer unit copolymerizable with acrylamide, acrylate or methacrylate, and there is the following relationship among m, n and p:

$m+n+p=100\%$ by mole $30\%$ by mole $\leq m \leq 100\%$ by mole $0\%$ by mole $\leq n+p \leq 70\%$ by mole said hydrazine hydrate and/or said water-soluble alkaline earth metal salt being employed at least in an amount equal to the weight of said acrylic or methacrylic hydrazide polymer.

2. The process of claim 1, wherein the acrylate is at least one menber selected from the group consisting of methyl acrylate, ethyl acrylate, butyl acrylate and 2-ethylhexyl acrylate.

3. The process of claim 1, wherein the methacrylate is at least one member selected from the group consisting of methyl methacrylate, ethyl methacrylate and butyl methacrylate.

4. The process of claim 1, wherein the monomer copolymerizable with acrylamide, acrylate or methacrylate is at least one member selected from the group consisting of vinyl chloride, vinylidene chloride, vinyl acetate, butadiene, styrene, maleic anhydride and acrylonitrile.

5. The process of claim 1, wherein said water-soluble alkaline earth metal salt is an alkaline earth metal halide.

6. The process of claim 1, wherein said water-soluble alkaline earth metal salt is calcium chloride.